United States Patent Office 3,053,640
Patented Sept. 11, 1962

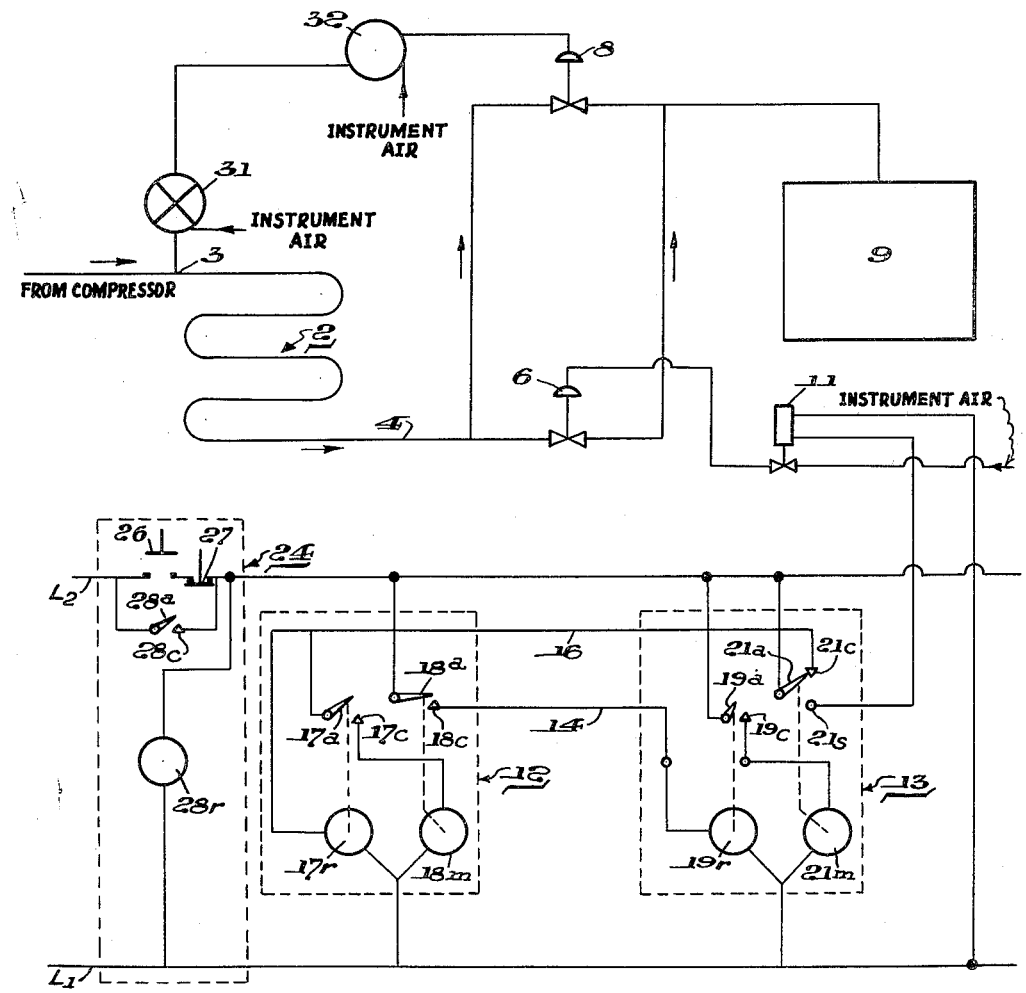

3,053,640
**APPARATUS FOR HIGH PRESSURE POLYMERIZA-
TION OF POLYMERIZABLE MATERIALS**
John G. Kirkpatrick, Crafton, and Frank Revell, Imperial,
Pa., assignors to Koppers Company, Inc., a corporation
of Delaware
Filed Jan. 8, 1957, Ser. No. 633,155
4 Claims. (Cl. 23—284)

This invention relates to apparatus for high pressure polymerization of polymerizable materials and more particularly to a valve system in combination with a reactor chamber of a high pressure polymerization apparatus.

In the process of high pressure polymerization of polymerizable materials it has been found advantageous to introduce the polymerizable materials into a closed reactor chamber, to raise the pressure in the chamber to a selected high level, to maintain the pressure at such level for a selected period of time, to drop the pressure to a much lower level and then to rebuild the pressure to the previously selected high pressure level, the cycle being repeated continuously. To carry out this operation a single, manually operated control valve has been used in the past to control the pressure at the high level point, to drop the pressure to the low level point, and to rebuild the pressure. This arrangement has proven inefficient since the single valve has been required to provide both fine throttling at a high pressure level point as well as serve as a speed valve to obtain the selected low level pressure. Further, the manually operated controls have proven to be expensive, requiring the attention of skilled labor and taking considerable time to maintain.

The present invention provides a valve system in combination with the reactor chamber of a high pressure polymerization apparatus which avoids the above mentioned disadvantages to effect an efficient and straightforward throttling of the pressure in the chamber at a selected high pressure level point and a speedy drop to a low pressure level point.

Various other features of the present invention will become obvious to one skilled in the art upon reading the disclosure set forth hereinafter.

More particularly, the present invention provides in combination with a high pressure polymerization reactor chamber which has a polymerizable material inlet and a polymerized material outlet, a valve system communicably connected to the material outlet comprising a first valve member, a first power control means for the first valve member, the first power control means including a timing mechanism and being co-operable with the first valve member to open and close the first valve member to effect a selected cyclic pressure drop in the reactor chamber, a second valve member connected in parallel with the first valve member, and a second power control means for the second valve member to throttle the second valve member to maintain a selected and stabilized operating pressure in the reactor chamber.

It is to be understood that various changes can be made in the arrangement, form, and construction of the several parts of the apparatus disclosed herein without departing from the scope or spirit of this invention.

Referring to the drawing, a schematic arrangement of the valve system for the pressure reactor is disclosed, this arrangement including a schematic electrical circuit used to control the letdown valve for dropping the pressure in the system. As can be seen in the drawing, a conventional tube-type reactor chamber 2 is provided, this reactor chamber having a polymerizable material inlet 3 at one end and a polymerized material outlet 4 at its other end. The inlet side 3 is connected to a material reservoir and compressor as is known in the art (not shown).

Communicably connected to the outlet side 4 of the reactor chamber in parallel with each other are two air-operated control valves 6 and 8. Valve 6 serves as a high speed response letdown valve and, as will be seen hereinafter, is arranged to drop the pressure in the reactor chamber to a selected low level point for a portion of an operating cycle. Valve 8 serves as a throttling valve and, as also will be seen hereinafter, is arranged to maintain the pressure at a selected high level point for a portion of the operating cycle. In an advantageous embodiment of the invention, valve 6 can be a 1 inch type valve and valve 8 a ⅜ inch type valve. In this connection, it is to be understood that the size valve can vary in accordance with the results desired in the system. Positioned immediately after the parallel valve arrangement is the high pressure polymerized material catch pot 9.

It is to be noted that the two valves are opened and closed by entirely independent control mechanisms. More specifically, the high speed letdown valve 6 is controlled by a three-way solenoid valve 11 connected thereto, this three-way solenoid valve, in turn, being connected to a timing circuit which operates to open and close valve 6 in a timed cycle. The timing circuit itself can be any one of several types of circuits and, in the embodiment disclosed in the drawing, includes two substantially similar timer arrangements indicated by the broken-line enclosures 12 and 13. Timer arrangements 12 and 13 are each connected across line $L_1$—$L_2$ and inter-connected to each other by lines 14 and 16. Timer arrangement 12 includes relay 17r effective when energized to bring armature 17a into contact with 17c. Timer arrangement 12 also includes timing motor 18m effective to bring armature 18a into engagement with contact 18c after the motor has been energized and run through its selected period. In a substantially similar manner, timer arrangement 13 includes relay 19r effective when energized to bring armature 19a into engagement with contact 19c. Timer arrangement 13 also includes timer motor 21m effective when energized to move immediately armature 21a away from contact 21c and into engagement with contact 21s to energize three-way solenoid valve 11, as will be seen more fully hereinafter.

The timing circuit disclosed also includes a conventional type make-break circuit arrangement indicated by the broken line enclosure 24. This make-break circuit arrangement includes make contact 26, break contact 27, and a relay 28r which is connected across line $L_1$—$L_2$. As is well known in the electrical art, relay 28r serves to control armature 28a to bring it into engagement with contact 28c when energized to provide a holding circuit for make contact 26.

To control the closing and opening of throttle valve 8, a pressure control system is provided. This control system senses and measures the pressure in reactor chamber 2 and controls a parallel stream of air which controls valve 8 to maintain pressure in reactor chamber 2 at a high pressure level point when valve 6 has been closed. The pressure control system includes pressure transmitter 31 which is connected advantageously to reactor chamber 2 at the material inlet side 3 thereof. It is to be understood that transmitter 31 can also be connected at other points of the reactor chamber. Transmitter 31 serves to sense and measure the pressure in the chamber 2 and, through a system of air relays disposed within the transmitter, to send out a signal ranging anywhere from about 3 p.s.i.g. to about 15 p.s.i.g., depending upon the pressure sensed in the reactor chamber. Since the pressure transmitter can be any one of a number of commercially well-known types of instruments, the instrument is presented only schematically in the subject disclosure. In this connection it is to be noted that a pressure recorder controller 32, which is connected between the pressure transmitter 31 and valve 8, is also disclosed only in a schematic manner since this instrument can be one of several well-known commercial types. Pressure recorder controller 32 serves to receive the signal from transmitter 31 and, through a system of self-contained air relays which sense the signal ranging from about 3 p.s.i.g. to about 15 p.s.i.g., to control the throttling valve 8, opening or closing this valve the necessary amount to hold the pressure within the reactor chamber 2 at the selected high level pressure point. This pressure recorder controller 32 can also be provided with an automatic reset controller means, as also is known in the art, to adjust for any time lags, transmission lags, and measurement lags which might occur in the closed system disclosed. It is to be noted that, if desired, the pressure transmitter 31 can be eliminated from the system completely by connecting the pressure recorder controller 32 directly to the reactor chamber 2.

In a typical operation of the apparatus disclosed during the manufacture of material such as high pressure polyethylene, starting with the high speed response letdown valve 6 closed, ethylene and a catalyst are introduced into reactor chamber 2 at the material inlet side 3 under the pressure of the compressor (not shown), the pressure building up to approximately 20,000 p.s.i.g. in about 15 seconds. As the selected high level pressure point is approached, namely 20,000 p.s.i.g., the pressure recorder controller 32 adjusts valve 8 to hold the 20,000 p.s.i.g. in the reactor chamber. This pressure is held in the reactor chamber for about a period of 45 seconds by virtue of the timing arrangement cooperating with valve 6 to keep such valve closed. At the end of the 45 second period, the valve 6 is caused to be opened by solenoid valve 11 which, in turn, is connected to the timing arrangement and the pressure is allowed to drop to approximately 11,000 p.s.i.g. before valve 6 is closed again and the cycle repeated with the pressure again building up to 20,000 p.s.i.g. in the reactor chamber. It is to be noted that because of the entirely independent operation of the high speed response letdown valve 6, throttle valve 8 is kept closed by pressure transmitter 31 until the compressor brings the reactor pressure back up to the 20,000 p.s.i.g. set point. At that time, the pressure recorder controller 32 throttles the air output to the valve 8, holding the reactor pressure at the selected high pressure level point.

To set up the abovementioned timing cycle for the opening and closing of the high speed response air-operated letdown valve 6, the push button make contact 26 is closed. When this occurs, relay 28r is energized causing armature 28a to engage contact 28c to provide a holding circuit around the push button make contact 26. Simultaneously, a circuit is completed through armature 21a which is in engagement with contact 21c, line 16, and the relay 17r (timer arrangement 12) to energize relay 17r. Upon energization of relay 17r, armature 17a is brought into engagement with contact 17c to energize timing motor 18m. Timing motor 18m has a timed period of delayed operation, advantageously 58 seconds, after which period it causes armature 18a to come into engagement with 18c. This results in energization of relay 19r (timer arrangement 13) through line 14. It is to be understood that the timed period of delayed operation of motor 18m can be varied in accordance with the results desired. The energization of relay 19r causes armature 19a to be moved into engagement with contact 19c. When this occurs, timing motor 21m is energized. Energization of motor 21m promptly causes armature 21a to move from contact 21c into engagement with contact 21s. This in turn energizes solenoid valve 11, causing the high speed response letdown valve 6 to open. Valve 6 is held open for a period of approximately 2 seconds, during which time pressure in the reactor chamber drops to approximately 11,000 p.s.i.g. as aforedescribed. After a 2 second period, timing motor 21m runs its course and armature 21a returns from 21s to 21c thus closing valve 6. The cycle is then repeated. It is to be understood that the timed period of motor 21m can be varied in accordance with the results desired.

In the manner abovedescribed, efficient and automatic apparatus is provided which can control the pressure in the reactor chamber of a high pressure polymerization apparatus with a minimum of labor and a minimum of repair.

The invention claimed is:

1. In combination with a high pressure polymerization reactor chamber, said chamber having a polymerizable material inlet and a polymerized material outlet, a valve system communicably connected to said material outlet comprising a first valve member, a first power control means for said first valve member, said first power control means including a timing mechanism and being co-operable with said first valve member to open and close said first valve member in timed manner to effect a selected polymerization cycle, said cycle including a period at which said reactor is maintained at a predetermined high pressure and a period at which said reactor chamber is maintained at a low pressure, a second valve member connected in parallel with said first valve member and being operative during said high pressure period, and a second power control member for said second valve member to throttle said second valve member in order to maintain said pressure in said reactor chamber stabilized at said pre-determined high pressure, said second power control means being independently operable from said first power control means and connected to said reactor chamber to sense deviations from said predetermined high pressure and thereby to throttle said valve member in accordance with the pressure deviations sensed in said chamber.

2. In combination with a high pressure polymerization reactor chamber, said chamber having a polymerizable material inlet and a polymerized material outlet, a valve system communicably connected to said material outlet comprising a first valve member, a first power control means for said first valve member, said first power control means including cyclically operating means comprising a first timing member to open said first valve member for a portion of each of said cycles to effect a period of low pressure operation in said reactor chamber and a second timing member to close said first valve member for the remainder of said selected cycle to effect a period of predetermined high pressure operation, a second valve member connected in parallel with said first valve member, and a second power control means for said second valve member to throttle said second valve member in order to maintain said pressure in said reactor chamber stabilized at said predetermined high pressure, said second power control means being independently operable from said first power control means and including pressure sensing means connected to said reactor chamber for sensing deviations in pressure from the predetermined high pressure in said chamber, said second power control means including means responsive to the sensed deviations from said predetermined high pressure to throttle said valve member in accordance with the pressure sensed in said chamber.

3. In combination with a high pressure polymerization reactor chamber having a material inlet and a material outlet, a pressure regulating system for said chamber connected to said outlet end comprising a first pressure regulating member, a power operated control means having a timing mechanism to operate automatically said first member to effect within said chamber a polymerization cycle including a period for polymerizing at a predetermined high period and a period of low pressure, a second pressure regulating member connected in parallel to said first pressure regulating member, and a control and pressure stabilizing means operatively connected to said chamber independently from said first power operated control means for sensing the deviations in pressure from a predetermined high pressure in said chamber, said control and pressure stabilizing means being responsive to said sensed deviations to operate said second pressure regulating member for maintaining the pressure at a predetermined and stabilized level during said high-pressure period.

4. In combination with a high pressure reactor chamber having a material inlet and a material outlet, a pressure regulating system for said chamber connected to said outlet end comprising a first pressure regulating valve, a power operated control means having a timing mechanism to open and close automatically said first valve to effect a cycle within said chamber having a high pressure polymerization period and a low pressure period, a second pressure regulating valve connected in parallel to said first pressure regulating valve, and a control and pressure stabilizing means operatively connected to said chamber for sensing deviations from a predetermined high pressure in said chamber, said control and pressure stabilizing means being responsive to said sensed deviations to operate said second pressure regulating member for maintaining the pressure at a selective and stabilized level during said high-pressure polymerization period.

References Cited in the file of this patent

UNITED STATES PATENTS

| | | |
|---|---|---|
| 1,249,293 | Norwood | Dec. 4, 1917 |
| 1,602,766 | Griswold | Oct. 12, 1926 |
| 1,911,201 | Milliken | May 30, 1933 |
| 2,808,316 | Hall | Oct. 1, 1957 |

OTHER REFERENCES

Perry: "Chem. Engineers Handbook," 3rd edition, McGraw-Hill Book Co., page 1326, New York, N.Y.